United States Patent [19]

Cartier

[11] Patent Number: 5,408,816
[45] Date of Patent: Apr. 25, 1995

[54] WHEELED, HAND-PROPELLED CARRIAGES FOR HORTICULTURAL DEVICES

[76] Inventor: Lucille L. Cartier, 24 Chemin Cartier, Kiamika, Qc, Canada, J0W 1G0

[21] Appl. No.: 266,476

[22] Filed: Jun. 27, 1994

[51] Int. Cl.⁶ .................. A01D 34/67; A01D 34/84; A01D 67/00
[52] U.S. Cl. .................. 56/17.5; 56/12.7; 56/DIG. 18; 172/17
[58] Field of Search .................. 56/16.7, 17.1, 17.2, 56/12.7, 17.5, DIG. 18; 172/17, 14, 13

[56] References Cited

U.S. PATENT DOCUMENTS

| | | | |
|---|---|---|---|
| 2,608,043 | 8/1952 | Berdan | 56/17.2 |
| 4,182,100 | 1/1980 | Letter | 56/16.7 |
| 4,442,659 | 4/1984 | Enbusk | 56/12.7 |
| 4,531,350 | 7/1985 | Huthmacher | 56/17.1 X |
| 4,688,376 | 8/1987 | Wolfe, Sr. | 56/12.7 X |
| 4,704,849 | 11/1987 | Gilbert et al. | 56/16.7 X |
| 4,922,694 | 5/1990 | Emoto | 56/16.7 |
| 5,092,112 | 3/1992 | Buckendorf, Jr. | 56/12.7 X |
| 5,095,687 | 3/1992 | Andrew et al. | 56/17.2 X |
| 5,279,102 | 1/1994 | Foster | 56/17.2 X |

Primary Examiner—Stephen J. Novosad
Attorney, Agent, or Firm—Antoine H. Gauvin

[57] ABSTRACT

The carriage for holding horticultural motorized hand-held cutting devices, comprises an elongated frame having opposite longitudinal sides and opposite lateral sides to define opposite ends. At least one wheel which defines the front of the carriage, is rotatably mounted on the frame at one of the opposite lateral sides. An auxiliary wheel frame assembly, near the other of the opposite lateral sides, extends from the elongated frame, respectively away from each of the opposite longitudinal sides and downwardly from the elongated frame into a leg. Each of the legs has a wheel rotatably mounted thereto. A handle on said elongated frame, propels and directs the motion of the carriage. The elongated frame has rotatably mounted thereto a supporting holder assembly for holding in an operating position a horticultural motorized hand-held cutting device such as a weed eater, an edger, a trimmer, a blade cutter for branches and a cultivator. With this carriage, at least a part of the vibrations generated by the motor of said horticultural motorized hand-held cutting device, is damped by said carriage.

20 Claims, 2 Drawing Sheets

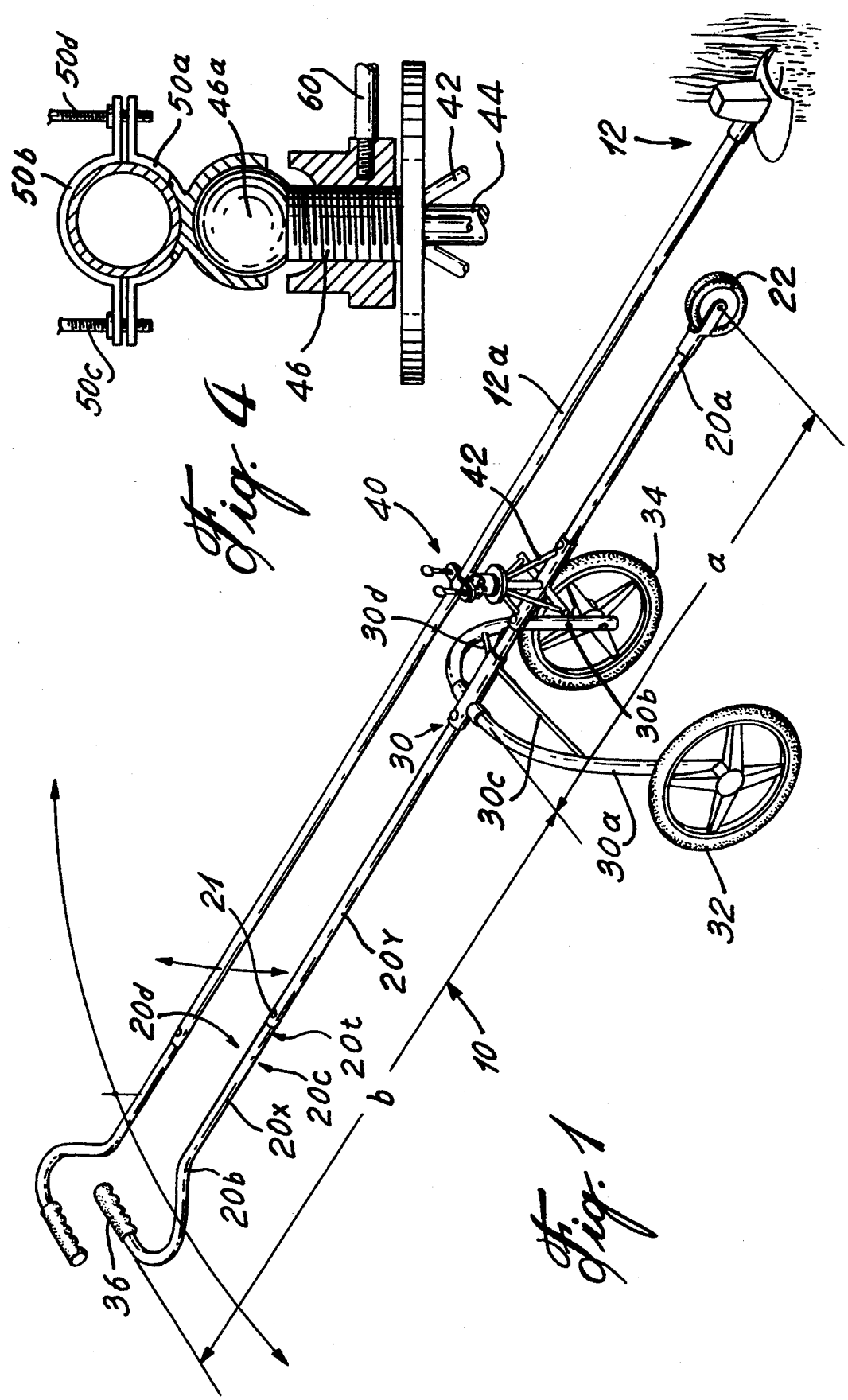

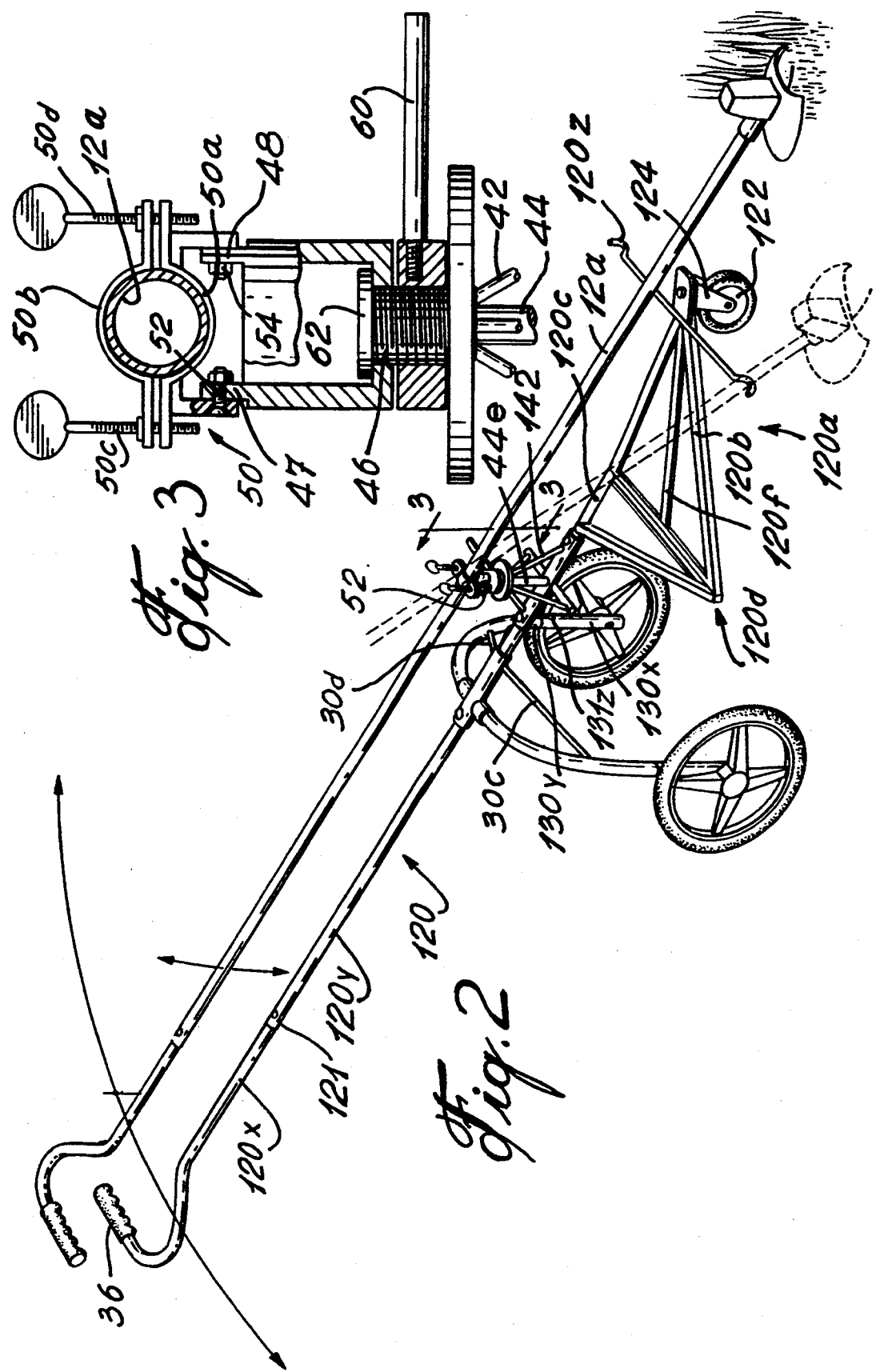

5,408,816

WHEELED, HAND-PROPELLED CARRIAGES FOR HORTICULTURAL DEVICES

BACKGROUND OF THE INVENTION

1. Field of the invention

This invention is directed to a wheeled, hand-propelled and multipurpose carriage for holding horticultural motorized hand-held cutting devices.

More particularly, this invention relates to a carriage having a supporting holder assembly for holding in an operating position the shaft of a horticultural motorized hand-held cutting device having a shaft and being selected from the group consisting of motorized weed eaters, edgers, trimmers, blade cutters for branches, cultivators and the like, whereby at least a part of the vibrations generated by the motor of said horticultural motorized hand-held cutting device is damped by said carriage. A part also of the weight of the horticultural motorized hand-held cutting device, is supported by said carriage.

These horticultural motorized hand-held cutting devices selected from the group consisting of motorized weed eaters, edgers, trimmers, blade cutters for branches, cultivators and the like are referred throughout the specification including the claims, as: "horticultural motorized hand-held cutting devices".

2. Description of related art

As far as applicant is aware, there are no hand-propelled carriages which are known for holding horticultural motorized hand-held cutting devices and even less for holding such devices in an operating position. Needless to say that there is no known apparatus to overcome the muscular pains caused by the vibrations of the motors of such horticultural motorized hand-held cutting devices. These pains last long overnight after a day of work. It is with these problems in mind that applicant has thought about means to avoid or reduce muscular pains when horticultural motorized hand-held cutting devices are used.

SUMMARY OF THE INVENTION

Broadly stated the invention is directed to a wheeled, hand-propelled and multipurpose carriage for holding horticultural motorized hand-held cutting devices having a shaft, comprising:

an elongated frame having opposite longitudinal sides and opposite lateral sides defining opposite ends, at least one wheel rotatably mounted on said frame near one of said opposite lateral sides, said wheel defining the front of said carriage, an auxiliary wheel frame assembly fixedly mounted on said frame nearer of said one of said opposite lateral sides than the other of said opposite lateral sides, said auxiliary wheel frame extending from said elongated frame, respectively away from each of said opposite longitudinal sides and downwardly from said elongated frame into a leg, each of said legs having a wheel rotatably mounted thereto, the wheels of said auxiliary wheel frame assembly being larger than the wheel of the front of said carriage, said elongated frame having at said other of said opposite lateral sides, a handle to propel and to direct the motion of the carriage, said elongated frame having mounted thereto, near said auxiliary wheel frame assembly and between said opposite lateral sides, a supporting holder assembly for holding in an operating position the shaft of a horticultural motorized hand-held cutting device having a shaft and being selected from the group consisting of motorized weed eaters, edgers, trimmers, blade cutters for branches and cultivators, whereby at least a part of the vibrations generated by the motor of said horticultural motorized hand-held cutting device is damped by said carriage.

DESCRIPTION OF THE DRAWINGS

Referring now to the drawings which illustrate some of the preferred ways of carrying out the invention:

FIG. 1 is a perspective view of a wheeled, hand-propelled and multipurpose carriage for holding horticultural motorized hand-held cutting devices;

FIG. 2 is a perspective view of another wheeled, hand-propelled and multipurpose carriage for holding horticultural motorized hand-held cutting devices;

FIG. 3 is an enlarged view, partly in cross-section, taken along line 3—3 of FIG. 2;

FIG. 4 is a view similar to FIG. 3 illustrating another supporting holder assembly for holding in an operating position the shaft of a horticultural motorized hand-held cutting device.

DETAILED DESCRIPTION OF SOME OF THE PREFERRED EMBODIMENTS OF THE INVENTION

Referring now to FIG. 1, a wheeled, hand-propelled and multi-purpose carriage 10 for holding horticultural motorized hand-held cutting devices 12 having a shaft 12a comprises:

an elongated frame 20 having opposite lateral sides 20a, 20b defining opposite ends, and opposite longitudinal sides 20c and 20d.

At least one wheel 22 is rotatably mounted on said frame 20 near one of said opposite lateral sides, such as 20a, said wheel defining the front of said carriage.

An auxiliary wheel frame assembly 30 is fixedly mounted on said elongated frame nearer of said one of said opposite lateral sides 20a than the other of said opposite lateral sides, such as 20b; said auxiliary wheel frame extending from said elongated frame 20 respectively away from each of said opposite longitudinal sides 20c, 20d and downwardly from said elongated frame into a leg, respectively 30a and 30b; each of said legs having a wheel 32, 34 rotatably mounted thereto, the wheels 32, 34 of said auxiliary wheel frame assembly being larger than the wheel 22 of the front of said carriage, for instance about twice as large as the front wheel. The auxiliary wheel frame assembly 30 with these wheels 32, 34 act as the fulcrum for the elongated frame 20.

The elongated frame 20 has at said other of said opposite lateral sides, such as 20b, a handle 36 to propel and to direct the motion of the carriage 10. Preferably this handle is parallel to said lateral sides 20a, 20b.

The elongated frame 20 has mounted thereto, fixedly or preferably rotatably mounted thereto, near said auxiliary wheel frame assembly 30 (i.e. close to the fulcrum for the elongated frame 20, and preferably between said fulcrum and said one of said opposite lateral sides 20a) and between said opposite lateral sides 20a, 20b, a supporting holder assembly 40 for holding in an operating position the shaft 12a of a horticultural motorized hand-held cutting device having a shaft 12a and being selected from the group consisting of motorized weed eaters, edgers, trimmers, blade cutters for branches and cultivators, as shown at 12, whereby at least a part of the vibrations generated by the motor of said horticultural motorized hand-held cutting device, is damped by said carriage 10.

In order to ease handling that is to propel, but more important to direct the motion of the carriage in the right direction, it is important that the lever be of a good length to reduce the force to be exerted on it, if one has to lift the front wheel. In a particular embodiment, the wheel of the front carriage defines a center, and said handle a free end and, the distance "a" (FIG. 1) from the wheel frame assembly on said elongated frame, to the wheel of the front carriage at its center, is half the distance "b" from the wheel frame assembly on said elongated frame, to said handle at said free end. Generally the ratio b/a is $3 > b/a > 1$ and preferably that ratio is $2 \pm 0.5$. This distance may vary, for instance, by providing a telescopic frame as shown at 20t and a releasably holding spring loaded push button 21 as is well known in the art; for instance by providing the inner tube 20x with a spring loaded push button outwardly urging against the inner surface of the outer tube 20y provided with orifices such as shown with the push botton 21 emerging therefrom. Other fastening means such as a compressing sleeve frictionally engaging the tubes 20x, 20y may also been used as is well known.

Although one wheel 22 is rotatably mounted on said frame 20 at one of said opposite lateral sides, such as 20a, it should be noted that a pair of wheels disposed on each side of the frame 20 are also contemplated, if desired.

In FIG. 1, the elongated frame 20 having opposite lateral sides 20a, 20b and opposite longitudinal sides 20c and 20d, is represented as a straight tube, which is preferred. It should however be noted that other structural elements may be used if desired, such as an angle iron, a H-beam, a T-beam coupled with appropriate fittings for the front wheel or wheels and handle.

It should be noted that the elongated frame 20 needs not to be a straight tube as shown in FIG. 1, but embraces a member in a straight line selected from the group consisting of a tube, a bar and a beam. The member needs not be in a straight line and not even in a same plane, but may take a plethora of shapes; and as shown in FIG. 2, for instance, and identified under the number 120. Here, the elongated frame is provided with a section 120a for transporting horticultural materials including boxes, bags and baskets containing horticultural tools, soil feeders and weed killers and the like.

In a particular embodiment, the elongated frame 120 of the hand-propelled multipurpose carriage defines a pair of equilateral triangles 120b, 120c, said triangles having a common base 120d, one of said triangle (120b) being substantially horizontal and the other (120c) upwardly extending so as to define a section for transporting horticultural materials, the apex of the horizontal triangle 120b extending outwardly and terminating into a bracket for said wheel 122 defining said front of said carriage, the frame 120 extending outwardly at the apex of the upwardly extending triangle 120c and away from the substantially horizontal triangle, to merge into a handle 36 as has been described relative to handle 36 of FIG. 1. The triangles 120b and or 120c may also be provided with reinforcing bars such as shown at 120f.

Preferably, the elongated frame 120 further includes between the apex of the horizontal triangle and the bracket for the wheel defining the front of said carriage, outwardly projecting elements, such as 120z, to receive a string element between said projecting elements and said apex of said upwardly extending triangle, to secure against said horizontal triangle, a container for receiving said horticultural material or as shown in FIG. 2 to support the shaft 12a of a horticultural motorized hand-held cutting device 12.

As shown in FIGS. 1 and 2, in a preferred embodiment the wheel frame 30 defines a round arch, and if desired, this arch is provided with reinforcing elements such as 30c and 30d.

Also, as shown in FIG. 2, in a preferred embodiment the leg, corresponding to 30a and 30b of FIG. 1, from each of said opposite longitudinal sides of the auxiliary wheel frame, is a telescopically mounted leg having a slidable leg portion 130x slidable over, or if desired under, a leg portion 130y and including means to releasably hold said slidable leg, as shown at 130x, 130y with a push button 131, with functions similar to those described for the telescopic frame at 20x, 20y and 21.

The frame near the handle to propel and to direct the motion of the carriage, is telescopic or slidable, as already described in FIG. 1, and is including means 121 to releasably hold said telescopic frame, having inner tube 120x and outer tube 120y for raising and lowering of the handle according to the height of a user with functions similar to those described for the telescopic frame at 20x, 20y and 21.

The supporting holder assembly 40 (FIG. 1), for holding in an operating position a horticultural motorized hand-held cutting device may take numerous forms. In a particular embodiment,as shown in FIGS. 1–3, the supporting holder assembly consists in a reinforcing branched support 42 fixedly mounted to the elongated frame 20 for holding a shaft 44. The shaft is fixed at one end to the elongated frame 20 or 120, as the case may be, and at the other end to a revolving swivel 46 having a pair of opposite upwardly extending arms 47, 48 (FIG. 1–3) or equivalents, such as a sleeve. A rocking shaft holder 50 having a pair of opposite jaws 50a, 50b mounted to-and-fro each other respectively for releasably holding said shaft of said motorized hand-held cutting device and said jaws being pivotally mounted to said upwardly extending arms of said swivel: For instance, each of said opposite extending arms having an eye, for receiving the rocking shaft-holder 50 having downwardly extending arms, via retaining pins or bolts and nuts 52, 54 bridging said rocking shaft holder to said pair of opposite extending arms or equivalents 47,48. In order to achieve the to-and-fro displacement of the jaws, the opposite jaws 50a, 50b, may be joined with bolts 50c, 50d or one of the bolts replaced with a hinge any other means to achieve this results is also contemplated.

The swivel may be releasably held if desired, for instance with a retaining ring having a handle such as shown at 60 (FIG. 3). Also the shaft 44 may be threaded in its end adjacent the swivel, as well as the swivel to form a turnbuckle 62 for adjustment in height of said swivel and thereby said rocking shaft-holder.

Other systems of supporting-holder assemblies for holding in an operating position a horticultural motorized hand-held cutting device may be used, preferably articulated in all directions, universal joints and kneejoints, such as the articulated couplings that are used for cameras, telescopes, X-rays for dentists.

For instance, instead of the revolving swivel 46 connecting the jaw 50a shown in FIG. 3, as shown in FIG. 4, the revolving swivel 46 may terminate into a ball-shaped end 46a for moving into a socket fixedly mounted onto the jaw 50a, for a ball-and-socket joint; the jaw 50b and the bolts 50c and 50d remaining the same. Here, we can see also that the swivelling device which cooperates with a tilting device is a knee-joint, and said swivelling device is used to rise and lower said knee-joint.

The supporting holder assembly 40, may also be defined to consist in a branched support 42 fixedly mounted to the elongated frame,
a tilting head including a pair of jaws 50a, 50b, mounted to-and-fro each other respectively for releasably holding said shaft of said motorized hand-held cutting device, and a declination axis, respectively 52, 54;
a swivel 46 bridging said tilting head via said declination axis, to said reinforcing branched support.

The tilting head may have a handle joining the declination axes to frictionally hold the upwardly extending arms of said swivel to the the downwardly extending arms of the rocking shaft-holder 50 for releasably holding the declination axes of the tilting head.

Although FIGS. 1 and 2 illustrate a wheeled, hand-propelled and multipurpose carriage for holding horticultural motorized hand-held cutting devices having only one wheel rotatably mounted on said the elongated frame at one of its opposite lateral sides, it can easily be seen that the wheel defining the front of the carriage may be a pair of wheels. Also although as shown in FIG. 1, the wheel 22 is rotatably mounted on the elongated frame 20, the wheel or wheels may be rotatably mounted on a swivelling or rotating coupling 124 mounted to the elongated frame 120, as shown in FIG. 2; if desired, the elongated frame 120 may be sectioned into two sections near said at least one wheel defining the front of the carriage, to receive a pair of wheels, or a swivel 124 may be provided for joining said frame 120 or 20 to said at least one wheel as illustrated at 122 so that said at least one wheel defining the front of the carriage be swivelling with respect to said frame.

OPERATION

As can be seen in FIG. 1, in order to operate the wheeled, hand-propelled and multipurpose carriage for holding horticultural motorized hand-held cutting devices, the shaft of a horticultural motorized hand-held cutting device 12 is squeezed between the jaws 50a, 50b of the rocking shaft-holder 50. Then, one hand of the user is placed on the handle 36 while the other hand of the user is placed on the handle of the horticultural motorized hand-held cutting device 12, the vibrations of the motor of the horticultural motorized hand-held cutting device 12 being absorbed by the supporting holder assembly 40 to the wheels 32, 34.

While this invention has been described in conjunction with some of the preferred embodiments thereof, it is clear and obvious from the above description that numerous modifications and changes therein may be made by those skilled in the art without departing from the spirit and scope of this invention as defined by the claims appended hereto.

I claim:

1. A wheeled, hand-propelled and multipurpose carriage for holding horticultural motorized hand-held cutting devices having a shaft, comprising:
   an elongated frame having opposite longitudinal sides and opposite lateral sides defining opposite ends,
   at least one wheel rotatably mounted on said elongated frame, near one of said opposite lateral sides, said wheel defining the front of said carriage,
   an auxiliary wheel frame assembly fixedly mounted on said elongated frame nearer of said one of said opposite lateral sides than the other of said opposite lateral sides, said auxiliary wheel frame extending from said elongated frame, respectively away from each of said opposite longitudinal sides and downwardly from said elongated frame into a leg, each of said legs having a wheel rotatably mounted thereto, the wheels of said auxiliary wheel frame assembly being larger than the wheel of the front of said carriage,
   said elongated frame having at said other of said opposite lateral sides, a handle to propel and to direct the motion of the carriage,
   said elongated frame having mounted thereto, near said auxiliary wheel frame assembly and between said opposite lateral sides, a supporting holder assembly for holding in an operating position the shaft of a horticultural motorized hand-held cutting device having a shaft and being selected from the group consisting of motorized weed eaters, edgers, trimmers, blade cutters for branches and cultivators,
   whereby at least a part of the vibrations generated by the motor of said horticultural motorized hand-held cutting device, is damped by said carriage.

2. The hand-propelled multipurpose carriage for horticultural end uses as defined in claim 1, wherein said supporting holder assembly for holding in an operating position a horticultural motorized hand-held cutting device is rotatably mounted to said elongated frame.

3. The hand-propelled multipurpose carriage for horticultural end uses as defined in claim 1, wherein said wheel frame defines a round arch.

4. The hand-propelled multipurpose carriage for horticultural end uses as defined in claim 1, wherein said elongated frame is a member in a straight line selected from the group consisting of a tube, a bar and a beam.

5. The hand-propelled multipurpose carriage for horticultural end uses as defined in claim 1, wherein said elongated frame is provided with a section for transporting horticultural materials selected from the group consisting of boxes, bags and baskets containing horticultural tools, soil feeders and weed killers.

6. The hand-propelled multipurpose carriage for horticultural end uses as defined in claim 1, wherein only one wheel is rotatably mounted on said frame at said one of said opposite lateral sides for defining said front of said carriage.

7. The hand-propelled multipurpose carriage for horticultural end uses as defined in claim 1, wherein said elongated frame defines a pair of equilateral triangles, said triangles having a common base, one of said triangle being substantially horizontal and the other upwardly extending so as to define a section for transporting horticultural materials,
   the apex of the horizontal triangle extending outwardly and terminating into a bracket for said wheel defining said front of said carriage, the frame extending outwardly at the apex of the upwardly extending triangle extending and perpendicularly to the common base, to merge into said handle.

8. The hand-propelled multipurpose carriage for horticultural end uses as defined in claim 1, wherein said elongated frame defines a pair of equilateral triangles, said triangles having a common base, one of said triangle being substantially horizontal and the other upwardly extending so as to define a section for transporting horticultural materials, the apex of the horizontal triangle extending outwardly and terminating into a bracket for said wheel defining said front of said carriage, the frame extending outwardly at the apex of the upwardly extending triangle extending and perpendicularly to the common base, to merge into said handle, including between the apex of the horizontal triangle and the bracket for said wheel defining said front of said carriage, outwardly projecting elements:

to receive a string element between said projecting elements and said apex of said upwardly extending triangle, to secure against said horizontal triangle, a container for receiving said horticultural material, and to support the shaft of a horticultural motorized hand-held cutting device.

9. The hand-propelled multipurpose carriage for horticultural end uses as defined in claim 1, wherein said supporting holder assembly is between said auxiliary wheel frame assembly and said one of said opposite lateral sides.

10. The hand-propelled multipurpose carriage for horticultural end uses as defined in claim 1, wherein said supporting holder assembly for holding a horticultural motorized hand-held cutting device consists in a reinforcing branched support bridging a shaft to the elongated frame, said shaft itself being fixed at one end to the elongated frame and at the other end to a revolving swivel, said swivel having a pair of opposite upwardly extending arms, a rocking shaft holder having a pair of opposite jaws mounted to-and-fro each other respectively for releasably holding said shaft of said motorized hand-held cutting device and said jaws being pivotally mounted to said upwardly extending arms of said swivel.

11. The hand-propelled multipurpose carriage for horticultural end uses as defined in claim 10, which includes a means to releasably hold the swivel.

12. The hand-propelled multipurpose carriage for horticultural end uses as defined in claim 1, wherein said supporting holder assembly for holding a horticultural motorized hand-held cutting device consists in:

a supporting holder for holding said agricultural motorized hand-held cutting device, a swivelling device mounted on said elongated frame and cooperating with a tilting device, for bridging said supporting holder to said elongated frames and for swivelling and inclining said supporting holder.

13. The hand-propelled multipurpose carriage for horticultural end uses as defined in claim 1, wherein the wheel of the front carriage defines a center, and said handle a free end, and the ratio of the distance "a" from the wheel frame assembly on said elongated frame, to the wheel of the front carriage at its center, to the distance "b" from the wheel frame assembly on said elongated frame, to said handle at said free end, is $3 > b/a > 1$.

14. The hand-propelled multipurpose carriage for horticultural end uses as defined in claim 13, wherein the ratio b/a is $2 \pm 0.5$.

15. The hand-propelled multipurpose carriage for horticultural end uses as defined in claim 1, wherein said wheels of said auxiliary wheel frame assembly have a diameter about twice that of the wheel of the front of said carriage.

16. The hand-propelled multipurpose carriage for horticultural end uses as defined in claim 1, wherein said leg from each of said opposite longitudinal sides of said auxiliary wheel frame is a telescopically mounted leg having a slidable leg and including means to releasably hold said slidable leg, and said frame near said handle to propel and to direct the motion of the carriage is telescopic and including means to releasably hold said telescopic frame, for raising and lowering of the handle according to the height of a user.

17. The hand-propelled multipurpose carriage for horticultural end uses as defined in claim 1, wherein said elongated frame is sectioned into two sections near said at least one wheel defining the front of the carriage, and a swivel is joining said two sections so that said at least one wheel defining the front of the carriage is swivelling with respect to said carriage.

18. The hand-propelled multipurpose carriage for horticultural end uses as defined in claim 1, wherein said supporting holder assembly, consists in a branched support fixedly mounted to the elongated frame, a swivel bridging a tilting head to said reinforcing branched support, said tilting head including a pair of jaws mounted to-and-fro each other respectively for releasably holding said shaft of said motorized hand-held cutting device.

19. The hand-propelled multipurpose carriage for horticultural end uses as defined in claim 12, which includes a means to releasably hold at least one of said swivelling device and said tilting device.

20. The hand-propelled multipurpose carriage for horticultural end uses as defined in claim 12, wherein said swivelling device cooperating with a tilting device is a knee-joint, and said swivelling device is used to rise and lower said knee-joint.

* * * * *